US012402673B2

(12) United States Patent
Brick et al.

(10) Patent No.: US 12,402,673 B2
(45) **Date of Patent: *Sep. 2, 2025**

(54) MASK

(71) Applicant: Ford Global Technologies, LLC, Dearborn, MI (US)

(72) Inventors: William Charles Brick, Berkley, MI (US); Jason Powell, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 467 days.

This patent is subject to a terminal disclaimer.

(21) Appl. No.: 17/943,277

(22) Filed: Sep. 13, 2022

(65) Prior Publication Data

US 2024/0081439 A1 Mar. 14, 2024

(51) Int. Cl.
*A41D 13/11* (2006.01)
*A62B 23/02* (2006.01)

(52) U.S. Cl.
CPC .......... *A41D 13/1161* (2013.01); *A62B 23/02* (2013.01)

(58) Field of Classification Search
CPC ............ A41D 13/1161; A41D 2400/38; A41D 13/11; A62B 18/025; A62B 18/08; A62B 18/084; A62B 23/02; A62B 18/02; A62B 23/025; A62B 18/00; A45D 8/002
See application file for complete search history.

(56) References Cited

U.S. PATENT DOCUMENTS 3,500,825 A 3/1970 Andersson et al.
4,323,063 A 4/1982 Fisichella
5,165,395 A 11/1992 Ricci
6,173,712 B1 1/2001 Brunson
7,802,572 B2 9/2010 Hahne
9,827,723 B2 11/2017 Klockseth
11,000,081 B1 * 5/2021 Dobbins ............ A41D 13/1161
2007/0277829 A1 12/2007 Casewell
2008/0092909 A1 4/2008 Hahne
2010/0239625 A1 9/2010 Puckett et al.
2015/0335843 A1 * 11/2015 Matsubara ............ A61M 16/06 128/205.25
2015/0352309 A1 12/2015 Daly
2016/0243383 A1 8/2016 Yazdi et al.

(Continued)

FOREIGN PATENT DOCUMENTS

CN 104510031 A 4/2015
CN 106388081 A 2/2017
CN 110507020 A 11/2019

(Continued)

OTHER PUBLICATIONS

24pcs-visible-face-mask-with-clear-mouth-cover-transparent-lip-reading-respirator-mask. Wish. (n.d.). Retrieved Jun. 6, 2022, from https://www.wish.com/es/product/24pcs-visible-face-mask-with-clear-mouth-cover-transparent-lip-reading-respirator-mask-with-filters-anti-spray-anti-fogging-mask-show-your-smile-reusable-deaf-mute-people-mask-5fd3ac98bb824633599abc65?hide_login_modal=true&share=web.

(Continued)

*Primary Examiner* — Ophelia A Hawthorne
(74) *Attorney, Agent, or Firm* — David B. Kelley; Carlson, Gaskey & Olds, P.C.

(57) ABSTRACT

A mask may be configured as a respirator. A mask may be relatively easy to manufacture. A mask may be reusable and customizable. A mask may include a strap attachment configured such that a strap is attachable to the strap attachment without tying the strap into a knot.

19 Claims, 7 Drawing Sheets

(56) References Cited

U.S. PATENT DOCUMENTS

| | | | | |
|---|---|---|---|---|
| 2018/0264161 | A1 | 9/2018 | Welch | |
| 2022/0176169 | A1* | 6/2022 | Brick | A62B 23/02 |

FOREIGN PATENT DOCUMENTS

| | | | | | |
|---|---|---|---|---|---|
| IN | 202041019945 | A | | 5/2020 | |
| KR | 20220030667 | A | * | 9/2020 | A41D 13/1161 |
| KR | 20220145211 | A | * | 4/2021 | A62B 18/084 |
| WO | 1996010343 | A1 | | 4/1996 | |
| WO | 2021155421 | A1 | | 8/2021 | |

OTHER PUBLICATIONS

ClearMask™ Transparent Surgical Mask. ClearMask. (n.d.). Retrieved Jun. 6, 2022, from https://buy.theclearmask.com/collections/medical.

U.S. Department of Health and Human Services. (n.d.). Vacuum formed stopgap face mask. National Institutes of Health. Retrieved Jun. 6, 2022, from https://3dprint.nih.gov/discover/3dpx-013977.

* cited by examiner

MASK

TECHNICAL FIELD

This disclosure relates to a mask, and in particular a mask configured as a respirator.

BACKGROUND

Respirators are a type of mask worn over the mouth and nose to protect the wearer's respiratory system by filtering out substances such as dust, fumes, bacteria, etc., from inhaled air.

SUMMARY

In some aspects, the techniques described herein relate to a mask, including: a strap attachment configured such that a strap is attachable to the strap attachment without tying the strap into a knot.

In some aspects, the techniques described herein relate to a mask, wherein the strap attachment includes a first through-hole, a second through-hole, and a third through-hole configured such that the strap is attachable to the strap attachment by passing the strap through each of the first, second, and third through-holes.

In some aspects, the techniques described herein relate to a mask, wherein: the first through-hole is spaced-apart from the second through-hole in a first direction, and the third through-hole is spaced-apart from the first and second through-holes in a second direction perpendicular to the first direction.

In some aspects, the techniques described herein relate to a mask, wherein the strap attachment is configured such that the strap is attachable to the strap attachment by passing a free end of the strap out of the third through-hole and underneath a segment of the strap between the first and second through-holes.

In some aspects, the techniques described herein relate to a mask, wherein the strap attachment includes an indicator arrow between the first and second through-holes pointing in a direction away from the third through-hole.

In some aspects, the techniques described herein relate to a mask, wherein the first, second, and third through-holes are elliptical and exhibit major axes that are non-parallel to one another.

In some aspects, the techniques described herein relate to a mask, wherein the strap is a strand of elastic material having first and second free ends.

In some aspects, the techniques described herein relate to a mask, wherein: the strap attachment is a first strap attachment and the mask further includes second, third, and fourth strap attachments, the first and second strap attachments are configured to attach to a first strand without tying the first strand into any knots, and the third and fourth strap attachments are configured to attach to a second strand without tying the second strand into any knots.

In some aspects, the techniques described herein relate to a mask, wherein the strap attachment includes a through-hole configured to receive a fastener.

In some aspects, the techniques described herein relate to a mask, wherein: the fastener includes a head, a shaft, and a deflectable loop, and the deflectable loop is biased to a relaxed state in which the deflectable loop is able to retain the strap attachment on the shaft.

In some aspects, the techniques described herein relate to a mask, wherein: the head is arranged between an inner shell and an outer shell of the mask, and the shaft projects through an opening in the outer shell.

In some aspects, the techniques described herein relate to a mask, further including: a filter arranged between the inner and outer shells.

In some aspects, the techniques described herein relate to a mask, wherein: the outer shell includes a first opening in a first side wall, a second opening in a second side wall opposite the first side wall, and a third opening in a bottom wall, the inner shell includes a first opening in a first side wall, a second opening in a second side wall opposite the first side wall, and a third opening in a bottom wall such that the first, second and third openings of the inner shell substantially align with corresponding first, second and third openings of the outer shell, and the filter overlaps the first, second, and third openings of the inner and outer shells.

In some aspects, the techniques described herein relate to a mask, wherein the inner and outer shells each include: a forward panel; and a perimeter wall projecting from an edge of the forward panel to a free end.

In some aspects, the techniques described herein relate to a mask, wherein the perimeter walls of the inner and outer shells are tapered toward the forward panels.

In some aspects, the techniques described herein relate to a mask, wherein: the first, second, and third openings of the outer shell are formed in the perimeter wall of the outer shell, and the first, second, and third openings of the inner shell are formed in the perimeter wall of the inner shell.

In some aspects, the techniques described herein relate to a mask, further including: a seal adjacent the free ends of the perimeter walls of the inner and outer shells.

In some aspects, the techniques described herein relate to a mask, wherein the forward panels are transparent.

In some aspects, the techniques described herein relate to a mask, wherein the filter is arranged so as to not obscure a view through the forward panels.

In some aspects, the techniques described herein relate to a mask, including: an outer shell including a first opening in a first side wall, a second opening in a second side wall opposite the first side wall, and a third opening in a bottom wall; an inner shell including a first opening in a first side wall, a second opening in a second side wall opposite the first side wall, and a third opening in a bottom wall such that the first, second and third openings of the inner shell substantially align with corresponding first, second and third openings of the outer shell; and a filter overlapping the first, second, and third openings of the inner and outer shells, wherein the inner and outer shells each include a transparent forward panel and the filter is arranged so as to not obscure a view through the forward panels.

DETAILED DESCRIPTION

This disclosure relates to a mask, and in particular a mask configured as a respirator. Among other benefits, which will be appreciated from the below description, the disclosed mask is relatively easy to manufacture. Further, the disclosed mask is reusable, customizable, and adjustable.

Figure 1:
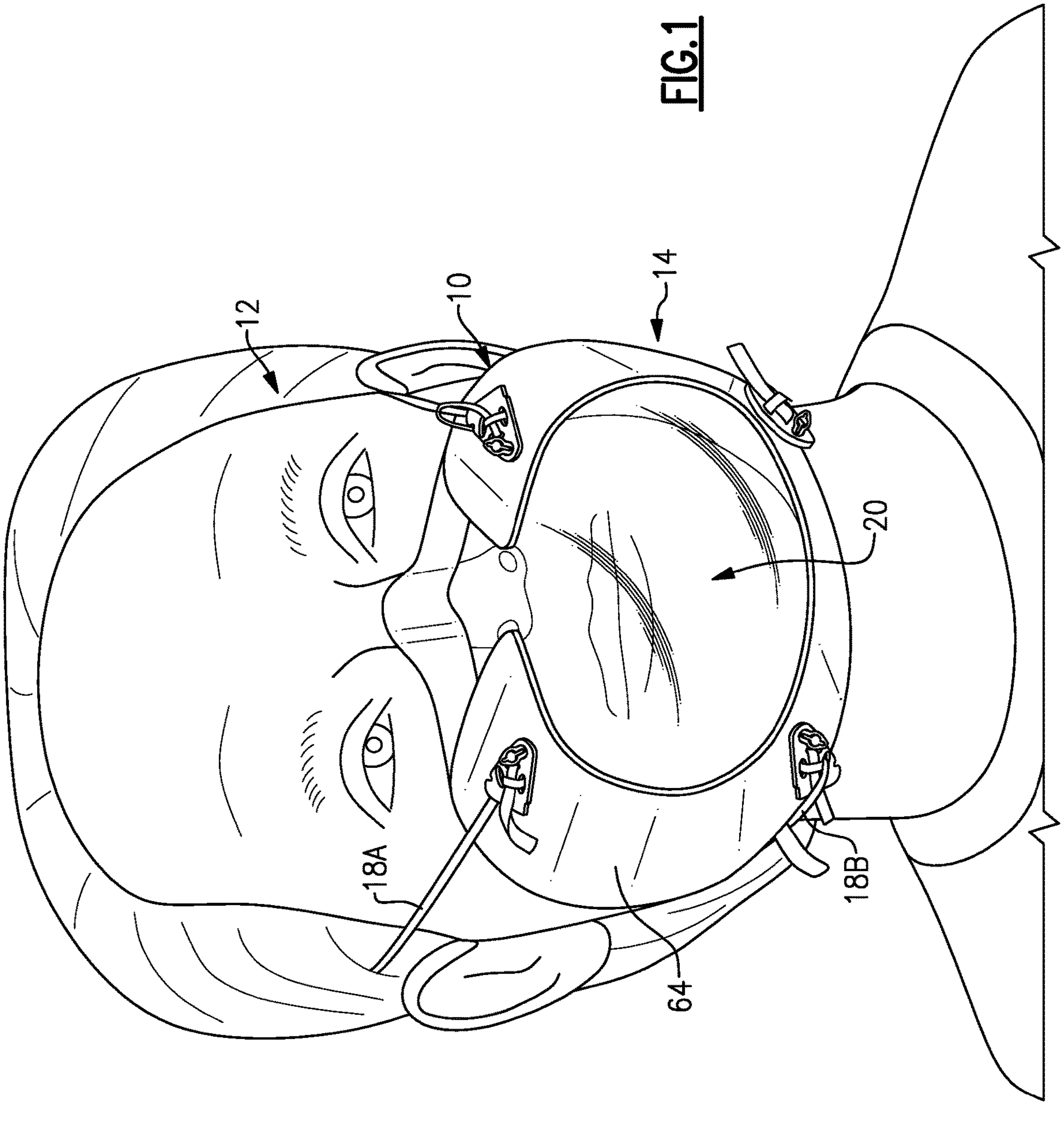
FIG. 1 is a front perspective view of an example mask worn by a wearer.

FIG. 1 illustrates a mask 10 being worn by a wearer 12. The mask 10 includes a number of components, and thus the mask 10 may be referred to as a mask assembly, mask system, a system, or an assembly. The mask 10 is configured as a respirator, and, when worn by the wearer 12, is configured to seal against a face of the wearer 12 so as to cover the mouth and nose of the wearer 12. In doing so, the mask 10 protects the respiratory system of the wearer 12 by filtering out substances such as dust, fumes, bacteria, etc., from inhaled air. The mask 10 also filters air exhaled by the wearer 12 to protect others in close proximity to the wearer 12 from any substances that may be present in the air exhaled by the user.

Figure 2:
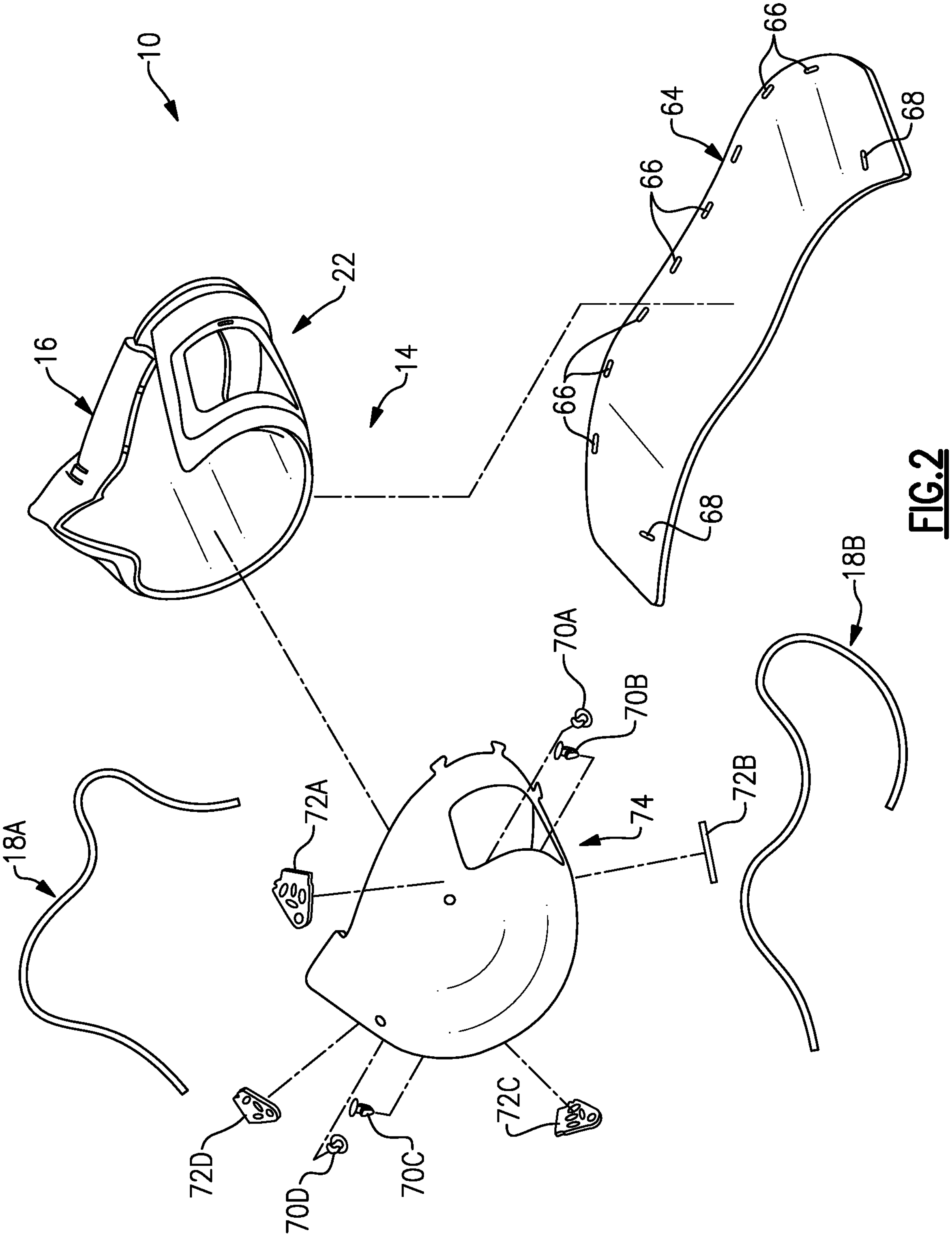
FIG. 2 is an exploded view of the example mask.

With joint reference to FIGS. 1 and 2, the mask 10 includes a facepiece portion 14 configured to surround a nose and mouth of the wearer 12. Adjacent the face of the wearer 12, the facepiece portion 14 is attached to a seal 16 which is configured to directly contact and seal against the face of the wearer 12. First and second straps 18A, 18B attached to the facepiece portion 14 pass around a head and/or neck of the wearer 12 and hold the seal 16 against the face of the wearer 12. In an example, the straps 18A, 18B are each provided by a respective strand of elastic material having two free ends and without any closed loops. In a particular example, the straps 18A, 18B exhibit a hollow, non-circular cross-section, which facilitates attachment to the mask 10 without tying knots.

With reference to FIG. 1, the facepiece portion 14 includes a front viewport 20, which is essentially a transparent window in a forward-facing portion of the facepiece portion 14 through which a view of the mouth and nose of the wearer 12 is unobstructed. The mask 10 is configured such that the front viewport 20 is spaced-apart from the tip of the nose of the wearer 12 and the mouth of the wearer 12. In this way, comfort of the mask 10 is increased. Further, as the front viewport 20 is transparent, more of the face of the wearer 12 is visible relative to traditional opaque masks, which facilitates non-verbal communication. The facepiece portion 14 is at least partially formed of plastic in this disclosure. The front viewport 20 provides a relatively large, blank surface, that can be customized by adding stickers or decals, depending on preferences of the wearer 12.

The facepiece portion 14 is provided by an inner shell 22 and an outer shell 24, in this example. The inner shell 22 is shown in more detail in FIGS. 3-5. The inner shell 22 includes a forward panel 26 and a perimeter wall 28 projecting from an edge of the forward panel to a free end 30. The forward panel 26 is transparent. In an example, the entire inner shell 22 is made of a transparent material. The perimeter wall 28 is tapered toward the forward panel 26 such that the inner shell 22 can fit within the outer shell 24.

Figure 3:
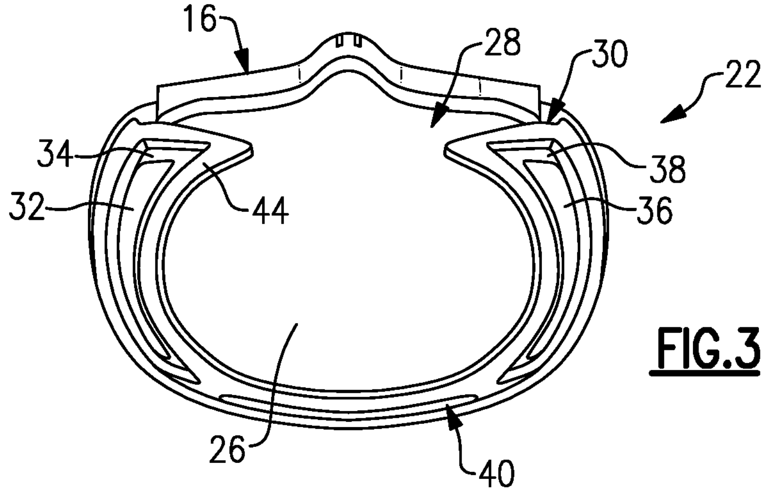
FIG. 3 is a front view of an inner shell of the example mask.
Figure 4:
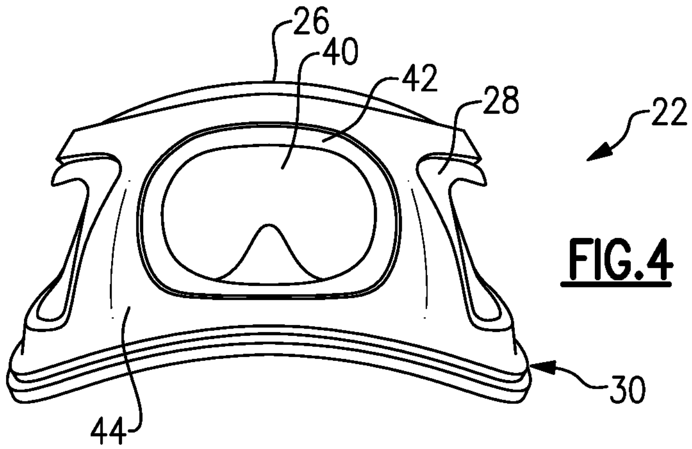
FIG. 4 is a bottom view of the inner shell.
Figure 5:
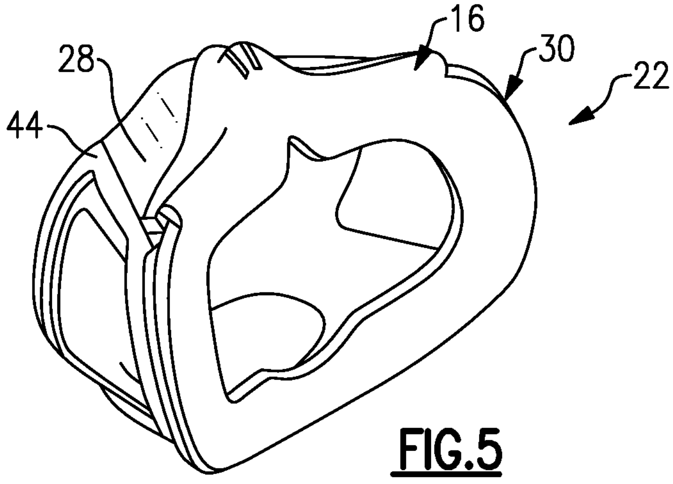
FIG. 5 is a rear-perspective view of the inner shell.

In FIGS. 3-5, the free end 30 is covered by the seal 16. The seal 16 is made of a material configured to form an airtight seal relative to the wearer 12. The seal 16 is made from polyvinyl chloride (PVC) foam in this example, and is adhered to the inner shell 22 using an adhesive.

The perimeter wall 28 includes a first opening 32 in a first side wall 34, a second opening 36 in a second side wall 38 opposite the first side wall 34, and a third opening 40 in a bottom wall 42. A gasket 44 is attached to an exterior of the perimeter wall 28 and surrounds an entire perimeter of each of the first opening 32, second opening 36, and third opening 40. The gasket 44 is made from polyvinyl chloride (PVC) foam in this example, and is adhered to the inner shell 22 using an adhesive.

Figure 6:
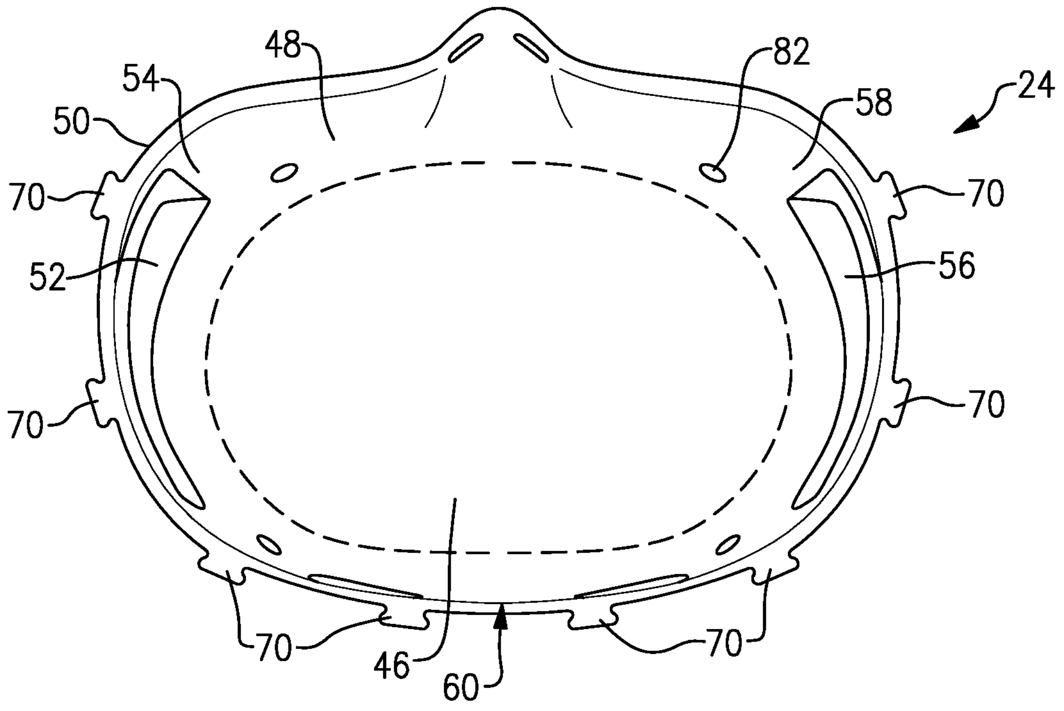
FIG. 6 is a front view of an outer shell of the example mask.
Figure 7:
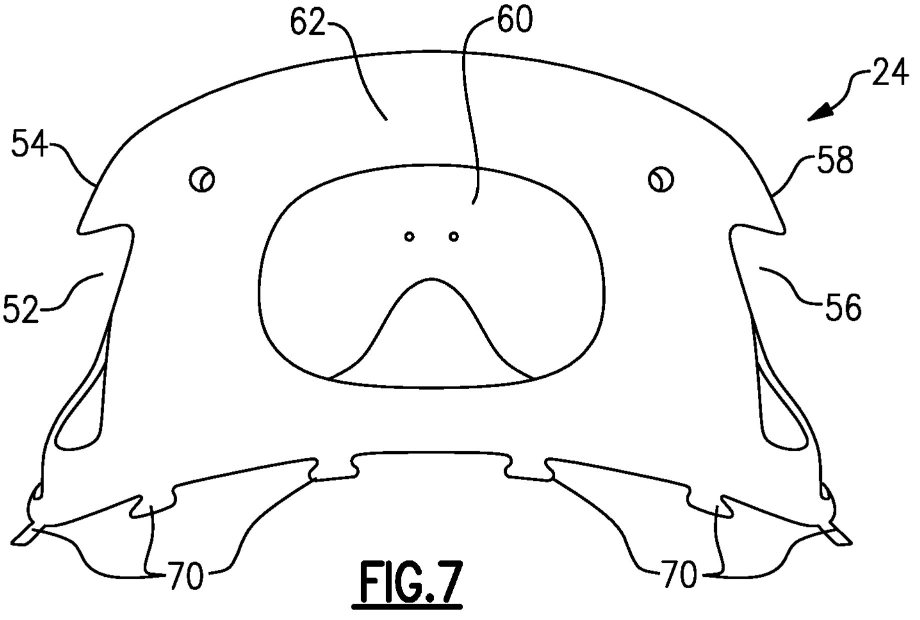
FIG. 7 is a bottom view of the outer shell.

The outer shell 24 is shown in more detail in FIGS. 6 and 7. The outer shell 24 includes a forward panel 46 and a perimeter wall 48 projecting from an edge of the forward panel to a free end 50. The forward panel 46 is transparent. In an example, the entire outer shell 24 is made of a transparent material. The perimeter wall 48 is tapered toward the forward panel 46 such that the inner shell 22 can fit within the outer shell 24.

The perimeter wall 48 includes a first opening 52 in a first side wall 54, a second opening 56 in a second side wall 58 opposite the first side wall 54, and a third opening 60 in a bottom wall 62. When the inner shell 22 is inserted into the outer shell 24, the first openings 32, 52, second openings 36, 56, and the third openings 40, 60 are substantially aligned with one another.

The inner and outer shells 22, 24 are shaped at respective free ends 30, 50 to correspond to a shape of a face of the wearer 12. In particular, free ends 30, 50 are contoured to accommodate a nose of the wearer 12. Further, the perimeter walls 28, 48 are dimensioned so that the forward panels 26, 46 do not directly contact a tip of a nose of the wearer 12 or the mouth of the wearer 12.

The inner and outer shells 22, 24 are formed of a plastic material, and in particular a transparent plastic material in this example. The plastic material may be rigid or deformable. The inner and outer shells 22, 24 are vacuum formed in one example. Other manufacturing techniques come within the scope of this disclosure. The forward panels 26, 46 could include an anti-fog coating in some examples. In one particular example, an inner surface of the forward panel 26 includes an anti-fog coating.

First openings 32, 52, second openings 36, 56, and the third openings 40, 60 are arranged in the perimeter wall 28, 48 and are configured to permit air to flow in and out of the mask 10, to and from the mouth and nose of the wearer 12. A filter 64 (FIGS. 1 and 2) is arranged between the inner and outer shells 22, 24 and overlaps the first openings 32, 52, second openings 36, 56, and the third openings 40, 60 of the inner and outer shells 22, 24. The filter 64 includes a plurality of rear slots 66 and forward slots 68 configured to attach to various structures to hold the filter 64 to the outer shell 24. The gasket 44 directs air through the filter 64 as opposed to permitting air to leak between the inner shell 22 and the outer shell 24. The straps 18A, 18B keep tension on the outer shell 24 such that the seal 16 is held against the wearer 12. In turn, the mask 10 is configured such that all air breathed by the wearer 12 passes through the filter 64. The filter 64 may be made of woven polypropylene fiber and it otherwise of a quality and type such that the mask 10 can use the filter 64 and meet the requirements of an N-95 respirator as defined by the relevant industry standards.

The filter 64 exhibits a length such that a single filter 64 can extend about the mask 10 to overlap each of the first openings 32, 52, second openings 36, 56, and the third openings 40, 60. By providing the filter 64 such that the filter 64 overlaps the first openings 32, 52, second openings 36, 56, and the third openings 40, 60 in the perimeter walls 28, 48, as opposed to the front viewport 20, the front viewport

20 remains unobscured by the filter 64, and the filter 64 is taken out of the direct path of exhalation of the wearer 12, prolonging the useful life of the filter 64. The filter 64 protects the wearer 12 from the nearby environmental conditions, and protects those near the wearer 12 from the air expelled by the wearer 12.

The free end 50 of the outer shell 24 includes a plurality of tabs 70 (FIGS. 6 and 7) configured to project into corresponding slots 66 (FIG. 2) in the filter 64 to hold the filter 64 in place, in this example. The mask 10 further includes fasteners 70A-70D (FIG. 2) configured to hold strap attachments 72A-72D relative to the mask 10. In an example, in addition to holding the strap attachments 72A-72D relative to the mask 10, two of the fasteners 70A, 70D pass through the forward slots 68 to further hold the filter 64 in place. The fasteners 70A-70D and strap attachments 72A-72D may be made of plastic in one example.

Figure 9:
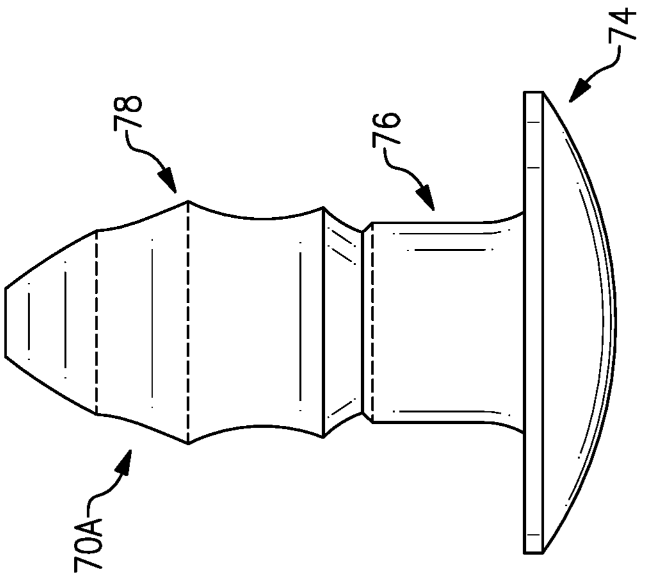
FIG. 9 is another side view of the example fastener.
Figure 8:
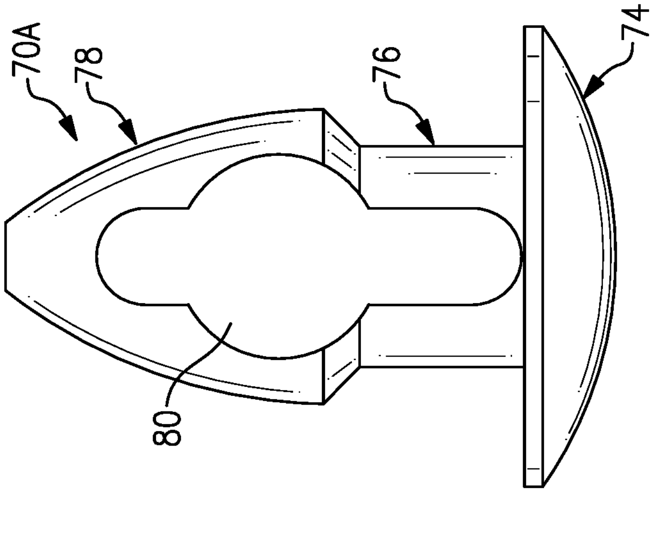
FIG. 8 is a side view of an example fastener.

FIGS. 8 and 9 illustrate an example fastener 70A in more detail. It should be understood that the fasteners 70B-70D are arranged substantially similarly. The fastener 70A includes a head 74, a shaft 76, and a deflectable loop 78. The shaft 76 exhibits a lesser diameter than the head 74 and the deflectable loop 78. Within the deflectable loop 78, the body of the fastener 70A includes a cutout 80 such that the deflectable loop 78 can deflect from its relaxed state, which is shown in FIG. 7, to a deflected state in which the deflectable loop 78 is urged toward a centerline of the fastener 70A under force to permit insertion of the deflectable loop 78 into an opening of the strap attachment 72A, which permits the opening of the strap attachment 72A to slide over the shaft 76. Once the force is removed, the deflectable loop 78 returns to its relaxed state in which the deflectable loop 78 exhibits a diameter greater than the opening of the strap attachment 72A such that the strap attachment 72A is retained on the shaft 76. In use, the head 74 is arranged on an interior of the outer shell 24 such that the shaft 76 projects through an opening 82 in the outer shell 24. The opening 82 is at a forward corner of the outer shell 24, which increases stability. The outer shell 24 includes three additional openings at forward corners thereof corresponding to the strap attachments 72B-72D.

Figure 10:
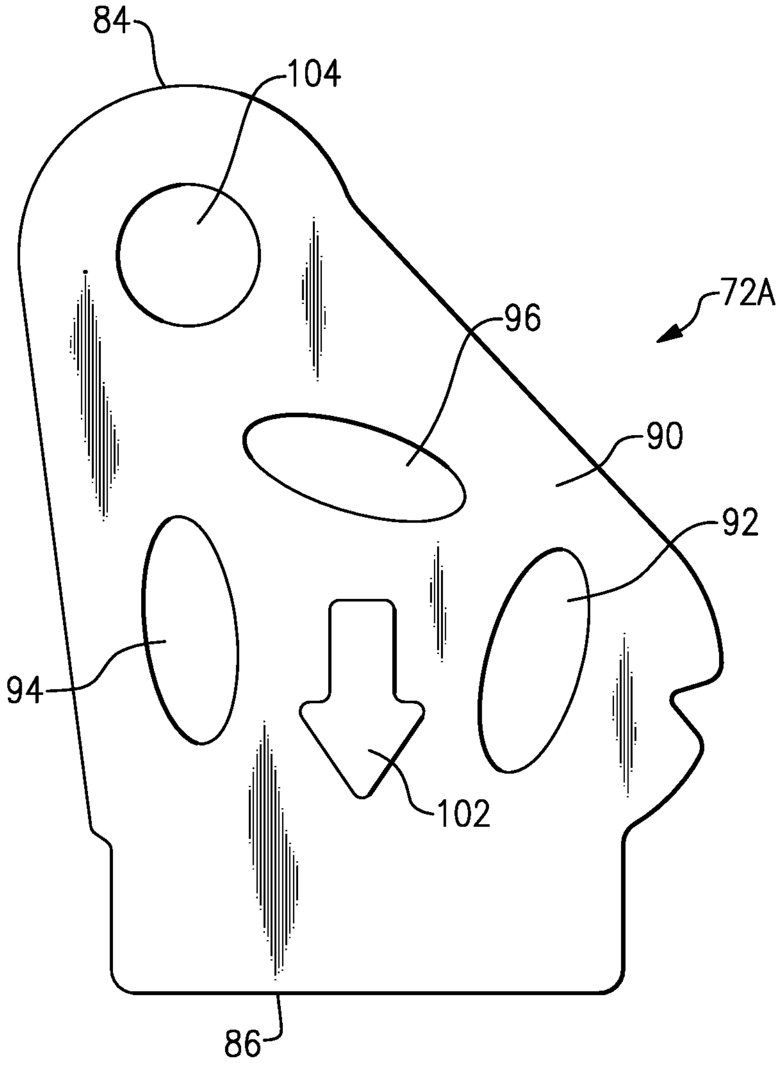
FIG. 10 is a top view of an example strap attachment.

FIG. 10 illustrates an example strap attachment 72A in more detail. The strap attachments 72B-72D are arranged substantially similarly. The strap attachment 72A is configured such that the strap 18A can be attached to the strap attachment 72A without tying the strap 18A into a knot or providing the strap 18A with a fixed loop, which are rigid loops that do not permit adjustment. In this way, the strap 18A merely needs to be weaved or wrapped relative to the strap attachment 72A, which facilitates ease of assembly of the mask 10. Further, the strap attachment 72A readily permits a user to make adjustments to the tightness and/or fit of the mask 10 by manipulating the strap 18A.

The strap attachment 72A exhibits a length between a forward end 84 and a rear end 86, and a width perpendicular to the length. The strap attachment 72A includes a plurality of through-holes, which extend between a first side 88 (FIG. 11), which here is an underside, and a second side 90, which here is a top side, of the strap attachment 72A.

The through-holes that facilitate attachment of the strap 18A will now be described. The strap attachment 72A includes a first through-hole 92, a second through-hole 94, and a third through-hole 96 configured to permit one to attach the strap 18A to the strap attachment 72A. The first through-hole 92 is spaced-apart in a direction of the width of the strap attachment 72A from the second through-hole 94. The third through-hole 96 is closer to the forward end 84 than the first and second through-holes 92, 94. The third through-hole 96 is also arranged between the first and second through holes 92, 94. In this example, the first, second, and third through-holes 92, 94, 96 are elliptical and exhibit major axes that are non-parallel to one another. The arrangement of the through-holes facilitates weaving of the strap 18A such that the strap 18A can attach to the strap attachment 72A without tying the strap 18A into a knot.

Figure 11:
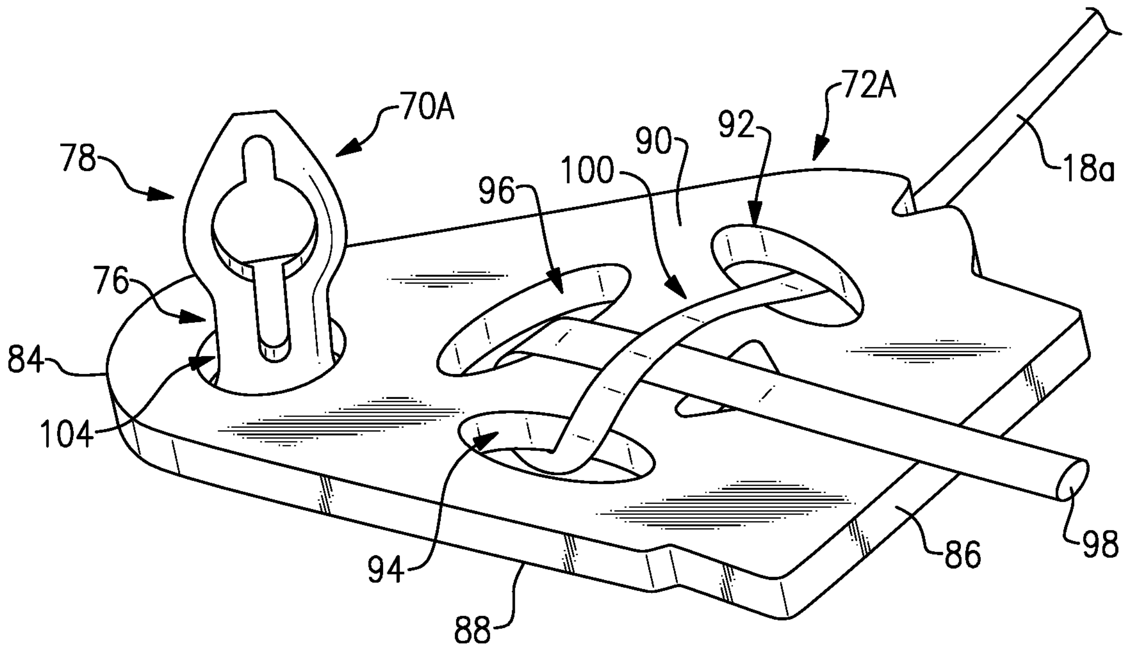
FIG. 11 is a perspective view of the strap attachment arranged relative to the example fastener and a strap.

In one example, as shown in FIG. 11, the strap 18A is attached to the strap attachment 72A by passing a free end 98 of the strap 18A from the first side 88 through the first through-hole 92, and then from second side 90 through the second through hole 94. Next, the free end 98 is passed from the first side 88 through the third through-hole 96. The free end 98 is then passed under the segment 100 of the strap 18A between the first and second through-holes 92, 94. Specifically, the free end 98 is passed between the segment 100 and the second side 90. The free end 98 is then pulled away from the third through-hole 96 to tension the strap 18A.

The strap 18A is made of an elastic material in this example such that weaving the strap 18A in the above-described manner will hold the strap 18A in place relative to the strap attachment 72A. An opposite free end of the strap 18A is weaved in a similar manner relative to strap attachment 72D, and the strap 18A can then be passed around the head of the wearer 12. The strap 18B is attached to strap attachments 72B, 72C in a similar manner. While an exemplary manner for attaching a strap to a strap attachment has been described, this disclosure extends to other strap attachment techniques that do not require a user to tie a strap into a knot.

The strap attachment 72A includes an indicator arrow 102 in this example. The arrow 102 is pointing in the direction that a user is to pull on the free end 98 to tighten the mask 10. The arrow 102 may be formed as a through-hole in one example. The arrow 102 may take other forms, including being provided as a recess into the second side 90, painted-onto the second side 90, or applied as a sticker, as examples.

The strap attachment 72A also includes a through-hole 104 configured to attach to the fastener 70A. The through-hole 104 is closer to the forward end 84 than the first, second, and third through-holes 92, 94, 96. The through-hole 104 is circular in shape, in this example, and exhibits a diameter that permits the deflectable loop 78 to pass through the through-hole 104 when the deflectable loop 78 is in a deflected state, but not when the deflectable loop 78 is in a relaxed state. The through-hole 104 is exhibits a slightly larger diameter than the shaft 76.

Directional terms such as "upward," "downward," "forward," "rearward," "top," "bottom," etc., are used herein for purposes of explanation and with reference to the orientation of components illustrated in the drawings. Such directional terms should not be considered limiting. Further, it should be understood that terms such as "generally," "substantially," and "about" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A mask, comprising:

a strap attachment configured such that a strap is attachable to the strap attachment without tying the strap into a knot, wherein the strap attachment includes a through-hole configured to receive a fastener wherein the fastener includes a head, a shaft, and a deflectable loop, and wherein the deflectable loop is biased to a relaxed state in which the deflectable loop is able to retain the strap attachment on the shaft.

2. The mask as recited in claim 1, wherein:

the head is arranged between an inner shell and an outer shell of the mask, and the shaft projects through an opening in the outer shell.

3. The mask as recited in claim 2, further comprising:

a filter arranged between the inner and outer shells.

4. The mask as recited in claim 3, wherein:

the outer shell includes a first opening in a first side wall, a second opening in a second side wall opposite the first side wall, and a third opening in a bottom wall, the inner shell includes a first opening in a first side wall, a second opening in a second side wall opposite the first side wall, and a third opening in a bottom wall such that the first, second and third openings of the inner shell substantially align with corresponding first, second and third openings of the outer shell, and the filter overlaps the first, second, and third openings of the inner and outer shells.

5. The mask as recited in claim 4, wherein the inner and outer shells each comprise:

a forward panel; and a perimeter wall projecting from an edge of the forward panel to a free end.

6. The mask as recited in claim 5, wherein the forward panels are transparent.

7. The mask as recited in claim 6, wherein the filter is arranged so as to not obscure a view through the forward panels.

8. The mask as recited in claim 5, wherein:

the first, second, and third openings of the outer shell are formed in the perimeter wall of the outer shell, and the first, second, and third openings of the inner shell are formed in the perimeter wall of the inner shell.

9. The mask as recited in claim 5, further comprising:

a seal adjacent the free ends of the perimeter walls of the inner and outer shells.

10. The mask as recited in claim 5, wherein the perimeter walls of the inner and outer shells are tapered toward the forward panels.

11. A mask, comprising:

a strap attachment configured such that a strap is attachable to the strap attachment without tying the strap into a knot, wherein the strap attachment is a first strap attachment and the mask further comprises second, third, and fourth strap attachments, wherein the first and second strap attachments are configured to attach to a first strand without tying the first strand into any knots, and wherein the third and fourth strap attachments are configured to attach to a second strand without tying the second strand into any knots.

12. The mask as recited in claim 11, wherein the strap attachment includes a first through-hole, a second through-hole, and a third through-hole configured such that the strap is attachable to the strap attachment by passing the strap through each of the first, second, and third through-holes.

13. The mask as recited in claim 12, wherein:

the first through-hole is spaced-apart from the second through-hole in a first direction, and the third through-hole is spaced-apart from the first and second through-holes in a second direction perpendicular to the first direction.

14. The mask as recited in claim 13, wherein the strap attachment is configured such that the strap is attachable to the strap attachment by passing a free end of the strap out of the third through-hole and underneath a segment of the strap between the first and second through-holes.

15. The mask as recited in claim 14, wherein the strap attachment includes an indicator arrow between the first and second through-holes pointing in a direction away from the third through-hole.

16. The mask as recited in claim 12, wherein the first, second, and third through-holes are elliptical and exhibit major axes that are non-parallel to one another.

17. The mask as recited in claim 11, wherein the strap is a strand of elastic material having first and second free ends.

18. The mask as recited in claim 11, wherein the strap attachment includes a through-hole configured to receive a fastener.

19. A mask, comprising:

an outer shell including a first opening in a first side wall, a second opening in a second side wall opposite the first side wall, and a third opening in a bottom wall;

an inner shell including a first opening in a first side wall, a second opening in a second side wall opposite the first side wall, and a third opening in a bottom wall such that the first, second and third openings of the inner shell substantially align with corresponding first, second and third openings of the outer shell; and a filter overlapping the first, second, and third openings of the inner and outer shells, wherein the inner and outer shells each comprise a transparent forward panel and the filter is arranged so as to not obscure a view through the forward panels.

* * * * *